(No Model.)
I. M. BERRY.
MEAT AND VEGETABLE CHOPPER.
No. 410,682. Patented Sept. 10, 1889.
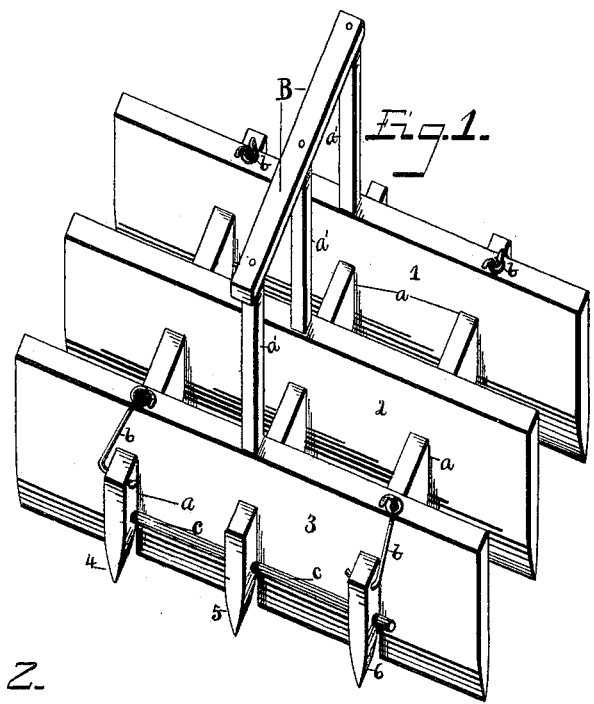
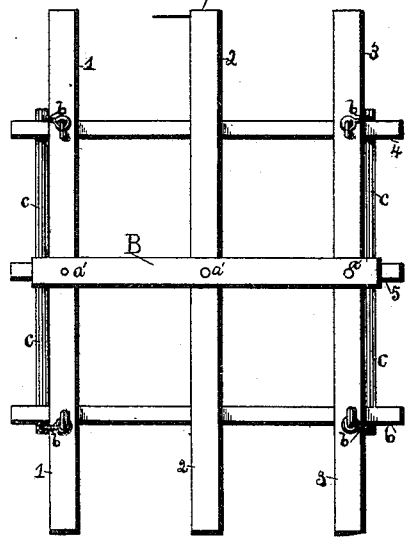
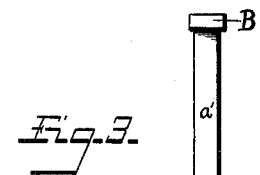
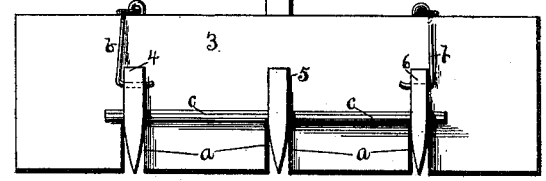
WITNESSES
John Bailey Johns
Wm. F. Brereton
INVENTOR
Ida May Berry
by Henry Wise Garnett
Attorney

United States Patent Office.

IDA MAY BERRY, OF SULLIVAN, ILLINOIS.

MEAT AND VEGETABLE CHOPPER.

SPECIFICATION forming part of Letters Patent No. 410,682, dated September 10, 1889.

Application filed April 8, 1889. Serial No. 306,343. (No model.)

*To all whom it may concern:*

Be it known that I, IDA MAY BERRY, a citizen of the United States, residing at Sullivan, in the county of Moultrie and State of Illinois, have invented certain new and useful Improvements in Meat and Vegetable Choppers; and I do hereby declare the following to be a full, clear, and exact description of the invention, such as will enable others skilled in the art to which it appertains to make and use the same.

My invention relates to improvements in meat and vegetable cutters; and my said invention consists in a hand mincing or chopping knife composed of a series of four, six, eight, or other even number of blades removably secured together, one-half of the number of said blades being arranged in lines parallel to and slightly separated from each other and at right angles to the other half of the series of blades, as and for the purposes as will hereinafter more fully appear, and be pointed out in the claim.

Heretofore, so far as I am aware, hand meat and vegetable choppers have usually been composed of two or three blades which were permanently secured in position to the handle, so that considerable danger of injury to the hands was experienced when attempting to cleanse the same. Consequently not unfrequently, therefore, this operation of cleaning was imperfectly performed.

The object, therefore, of my invention is to avoid these objections, and to accomplish this the parts composing the implement are so constructed that the blades thereof may be readily removed for cleaning and replaced without difficulty; and, in addition to this, the number of said blades is considerably increased over the number generally employed, so that the operation of chopping is rendered easy and quick of accomplishment, as I will now proceed to show.

Reference being had to the accompanying drawings for a better understanding of the details of construction of my invention. Figure 1 represents a view in perspective, Fig. 2 a plan, and Fig. 3 a side elevation, of a hand meat and vegetable chopper constructed according to my invention. Fig. 4 represents a detached view of one of the slotted blades.

As here shown, the implement is composed of six blades; but any number desired may be employed, such as four, eight, &c. One-half of the series of these blades—for instance, the ones 1 2 3—are somewhat wider than the ones 4 5 6, and are formed with a series of slots $a$, as seen in Fig. 4, into which the ones 4 5 6 are received, so that when in position each half of the number of the blades composing the implement is arranged in lines parallel to but slightly separated from each other and at right angles to and crossing each other. The space occupied by said implement will therefore be divided up into a number of squares, as seen in Fig. 2.

As before stated, the larger blades 1, 2, and 3 are vertically slotted, as at $a$, to receive the blades 4, 5, and 6, and at each end thereof upon its top edge are hooks $b$, which engage a hole through the top end of the outside blades 4 and 6, whereby said parts are securely but removably united together. If desired, such hooks may be provided for each end of the inner blades 4, 5, and 6; or, instead of such hooks being used upon the central blades, a transverse rod, as at $c$, may be employed for uniting these blades to the outside ones.

B is the handle of the device, which is supported by short posts $a'$ upon the blades 1, 2, and 3, as shown in Fig. 1.

This constitutes the construction of the parts composing my hand meat-chopper. Its use is the same as that of any similar form of implement.

When necessary to cleanse the same, the hooks $b$ are disengaged from the blades 4 and 6, which permits the blades 4 5 6 to be removed from the ones 1 2 3, when access to all parts of each blade may readily be obtained with little liability of injury to the hands of the operator.

The advantages, therefore, of my invention are, that by my system of securing the parts together the number of blades may be multiplied, and each blade may be removed for cleaning or sharpening.

Having thus described my invention, what I claim as new therein, and desire to secure by Letters Patent of the United States, is—

The hand meat and vegetable cutter herein described, composed of the slotted blades 1 2 3, narrow blades 4 5 6, fitting in said slotted blades, hooks $b$, rod $c$, and handle B $a'$, constructed and arranged substantially as and for the purposes specified.

IDA MAY BERRY.

In presence of—
 ROBERT M. PEADRO,
 A. B. LYNN.